United States Patent

Meidl et al.

[11] 3,932,278
[45] Jan. 13, 1976

[54] FILTER CLEANING METHOD

[75] Inventors: John A. Meidl; Thomas J. Vollstedt, both of Schofield, Wis.

[73] Assignee: Sterling Drug Inc., New York, N.Y.

[22] Filed: Feb. 15, 1974

[21] Appl. No.: 442,791

[52] U.S. Cl. ............... 210/80; 134/25 R; 210/62; 210/63; 210/82
[51] Int. Cl.² ........................................ B01D 41/02
[58] Field of Search ......... 134/25 R, 36, 104, 2, 39, 134/20; 210/35, 62, 63, 80, 82, 274, 275

[56] References Cited
UNITED STATES PATENTS

| | | | |
|---|---|---|---|
| 966,177 | 8/1910 | Dopp | 210/63 |
| 1,197,640 | 9/1916 | Kriegsheim | 210/62 X |
| 1,634,154 | 6/1927 | Lourens | 210/62 X |
| 1,990,214 | 2/1935 | Zapffe | 210/50 |
| 2,069,621 | 2/1937 | Patrick | 210/80 |
| 2,144,051 | 1/1939 | Frankforter | 210/62 X |
| 2,443,373 | 6/1948 | Borsoff | 134/20 |
| 2,648,440 | 8/1953 | Mullins | 210/80 |
| 2,966,431 | 12/1960 | Lorenz et al. | 134/25 R |
| 3,078,224 | 2/1963 | Schulze et al. | 210/82 X |

*Primary Examiner*—Charles N. Hart
*Assistant Examiner*—Robert G. Mukai
*Attorney, Agent, or Firm*—Thomas L. Johnson; B. Woodrow Wyatt

[57] ABSTRACT

A method of cleaning sand or multi-media filters which comprises a process of backwashing the filter with water containing a high concentration of chlorine or ozone.

4 Claims, 1 Drawing Figure

U.S. Patent  Jan. 13, 1976  3,932,278
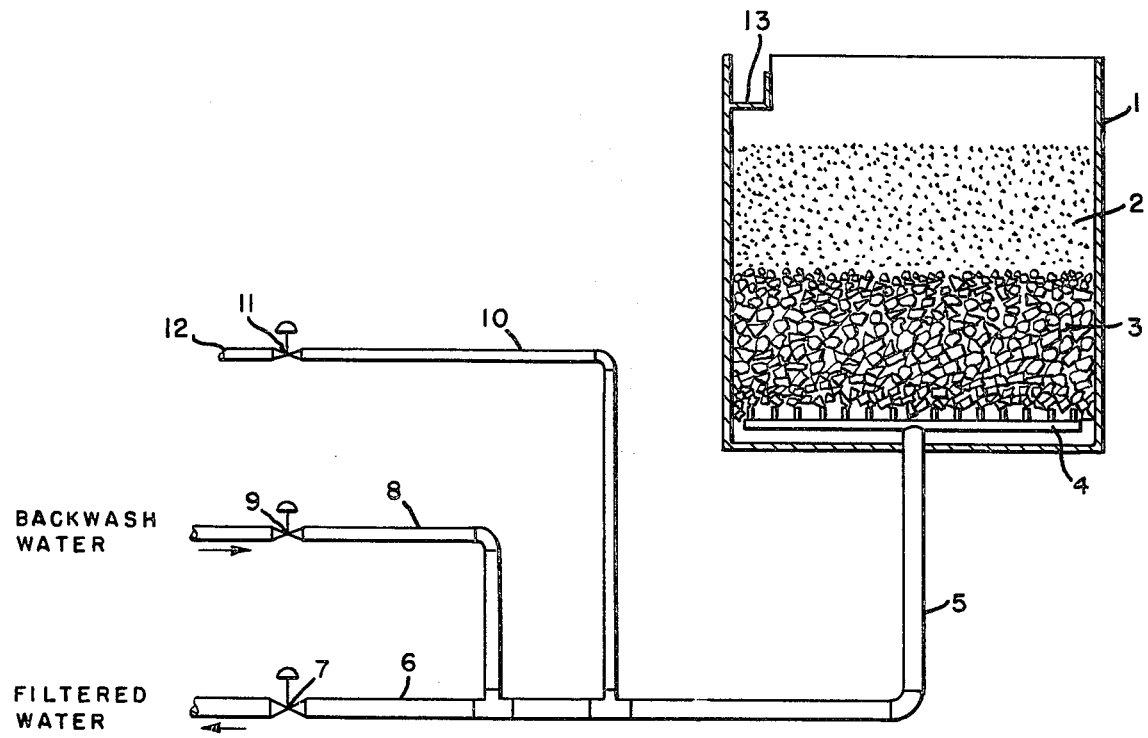

FILTER CLEANING METHOD

This invention relates to a method of cleaning sand or multi-media filters which comprises a process of backwashing the filter with water containing a high concentration of chlorine or ozone.

The formation on water filters and sewage treatment plant effluent filters of coatings which prevent proper operation of the filters has been a problem for decades. In some cases a biological growth and/or physical coating tends to form around individual sand grains or at, near the top of, or within a sand filter during the filtration cycle. Also, at times when the sand bed is backwashed with water, this cohesive mat of biological growth and sand forms large "mudballs" which, when allowed to accumulate in the bed, provide channels through which unfiltered water can pass, thereby lowering the efficiency of the filter.

The usual practice in combatting these conditions in attempting to clean the filter media is to use procedures such as surface washing, mechanical mixing and air mixing during the backwash cycle. Thus, the abrasive interaction between individual sand grains becomes the cleaning mechanism. However, the presence of coagulants, adsorbants such as activated carbon, and biological growths tend to make mechanical cleaning extremely difficult, and large quantities of backwash water and vigorous mechanical mixing are required to disassociate these coatings and/or agglomerations.

We have now discovered that if the filter media are treated with water that has dissolved in it a high concentration of chlorine or ozone, the coatings and agglomerations in the filter are readily removed. Ordinary chlorinated water, having less than about 25 ppm, is not effective. It is necessary to employ "superchlorinated" water having a chlorine concentration between about 50 and 500 ppm. In the case where ozone is used, the effective concentration is between about 20 and 200 ppm.

The chlorine or ozone can be introduced as a gas into the water prior to its application to the filter. Alternatively, the chlorine may be added to the water during the application of the water to the filter by applying to the filter surface a solid source of chlorine such as a hypochlorite salt, e.g. calcium hypochlorite, in amount sufficient to afford the required concentration of chlorine in the water.

The optimum contact time between the chlorinated or ozonated water and the filter media lies between about 2 minutes and 1200 minutes, dependent upon the concentration of chlorine or ozone and the thickness of the coating. The optimum concentrations and times are readily determined by routine experimentation.

The accompanying drawing depicts a system for carrying out the process of the invention. The filter 1 contains a filtration media, in this case sand 2 and gravel 3. Below this media is a filtered water collection system 4 that connects to a downcomer pipe 5 which in turn connects to a collection main 6. During normal filtration, valve 7 is in the open position and valve 9 in the closed position. During filter backwashing, however, flow to the filter is stopped and valve 7 is closed. Valve 9 is then opened and clear water is allowed to flow through conduits 8 and 5 into the bottom of the filter. Flow through the filter is such that entrapped particles from the filtration phase are carried upward out of the filter bed and are collected in a trough 13 for disposal. This method of backwashing, however, will not remove encrustations within or coatings on the filter media.

By injecting a high concentration of an oxidizing agent (chlorine, ozone) from a storage or production area 12 through regulator valve 11 and conduits 10 and 5 during the backwash cycle, or by adding such agents to the filter prior to backwashing, problem encrustations and/or coatings can be removed from the filter media.

The filter illustrated in the drawing is a multi-media filter containing sand and gravel; however, the process of the invention can be applied to other filters, such as those containing sand alone or sand with other media.

A particular application of this invention is directed to its use in connection with water purification processes using powdered activated carbon to adsorb organic substances. In this instance the coating which develops on the filter consists at least in part of activated carbon, and this coating is readily removed by treating the filter media with superchlorinated water or water with dissolved ozone in it while or before backwashing to remove the coating materials.

EXAMPLE 1

A sample of the filter media of a 100 cubic foot rapid sand filter of a tertiary wastewater treatment plant coated with activated carbon is contacted with varying amounts of calcium hypochlorite. It is determined that the optimum concentration and contact period that would eliminate the coating is 150 ppm of chlorine and 15 minutes, respectively.

The filter is backwashed with plain water to remove gross particles. Then one pound of calcium hypochlorite is sprinkled over the filter surface. After the hypochlorite has dispersed and intimate contact is achieved (15 minutes), the filter is backwashed to remove the sloughed off coating material.

EXAMPLE 2

A small 36 inch pressure sand filter of an extended aeration package plant has bed breakthrough after a relatively short filtration time. Normal backwashing at 70 gpm does not relieve this operational problem, so super chlorination of the filter backwash water is effected at approximately 250 mg/l by gaseous chlorine.

The chlorine regulator valve 11 is set to discharge 0.15 lb/min of gaseous chlorine for the duration of the backwash cycle. After the normal 10 minute backwash period, the regulator valve is re-set to its original position and filter operation once again resumes normally.

EXAMPLE 3

Problem encrustations have developed in a 400 ft$^2$ dual media rapid sand filter. The output of an on-site ozonation facility, normally used for disinfection of the filtered water, is increased to produce 102 lbs/hr of ozone. This supply is injected into the filter backwash water line at a concentration of 30 mg/l of ozone for the 10 minute backwash cycle. The filter is left out of operation until the next day when a normal backwash is again done to remove sloughed off encrusted material.

We claim:

1. The method of backwashing sand or multi-media filters employed in wastewater treatment or sewage treatment plants in order to remove a coating therefrom, said coating consisting at least in part of activated carbon, which comprises contacting the filter media with water containing between about 50 and 500 ppm of chlorine for a period of between about 2 minutes and 1200 minutes, and backwashing the filter to remove the sloughed off coating.

2. The method according to claim 1 in which gaseous chlorine is used as a source of chlorine.

3. The method according to claim 1 in which hypochlorite is applied to the filter as a source of chlorine.

4. The method of backwashing sand or multi-media filters employed in wastewater treatment or sewage treatment plants in order to remove a coating therefrom, said coating consisting at least in part of activated carbon, which comprises contacting the filter media with water containing between about 20 and 200 ppm of ozone for a period of between about 2 minutes and 1200 minutes, and backwashing the filter to remove the sloughed off coating.

* * * * *